US012583144B2

(12) United States Patent
Abe et al.

(10) Patent No.: US 12,583,144 B2
(45) Date of Patent: Mar. 24, 2026

(54) CUTTING DEVICE AND CUTTING METHOD

(71) Applicant: Panasonic Intellectual Property Management Co., Ltd., Osaka (JP)

(72) Inventors: Ryuta Abe, Osaka (JP); Tatsuya Masada, Hyogo (JP); Masahide Maruyama, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 286 days.

(21) Appl. No.: 18/284,393

(22) PCT Filed: Jan. 18, 2022

(86) PCT No.: PCT/JP2022/001546
§ 371 (c)(1),
(2) Date: Sep. 27, 2023

(87) PCT Pub. No.: WO2022/209161
PCT Pub. Date: Oct. 6, 2022

(65) Prior Publication Data
US 2024/0149484 A1 May 9, 2024

(30) Foreign Application Priority Data
Mar. 29, 2021 (JP) ................................ 2021-054942

(51) Int. Cl.
*B26D 11/00* (2006.01)
*B26D 3/08* (2006.01)
(Continued)

(52) U.S. Cl.
CPC ................ *B26D 11/00* (2013.01); *B26D 3/08* (2013.01); *H01G 11/28* (2013.01); *H01G 11/86* (2013.01); *H01M 4/04* (2013.01); *H01M 4/139* (2013.01); *B26D 1/08* (2013.01); *B26D 1/36* (2013.01); *B26D 7/204* (2013.01)

(58) Field of Classification Search
CPC .......... H01G 11/28; H01G 11/86; B26D 3/08; B26D 3/085; B26D 7/204; B26D 11/00
See application file for complete search history.

(56) References Cited

U.S. PATENT DOCUMENTS 4,275,629 A * 6/1981 McDowell .............. H01M 4/20
83/903

FOREIGN PATENT DOCUMENTS

| JP | 2016219330 A | * | 12/2016 | |
| JP | 2017-196669 | | 11/2017 | |
| JP | 2018073658 A | * | 5/2018 | B26D 7/204 |

OTHER PUBLICATIONS

English language translation of JP 2016219330 A to Hiroyasu et al. obtained from https://worldwide.espacenet.com/ on Sep. 5, 2023.*

(Continued)

*Primary Examiner* — Evan H MacFarlane
(74) *Attorney, Agent, or Firm* — Rimon P.C.

(57) ABSTRACT

A cutting device for cutting a continuous body of an electrode plate, the electrode plate including a current collector plate, a first active material layer, and a second active material layer, the cutting device including: a first process unit that causes a first cutting blade to form an incision in the first active material layer; and a second process unit that causes a second cutting blade to cut the continuous body.

5 Claims, 4 Drawing Sheets

(51) Int. Cl.

| | |
|---|---|
| *B26D 7/20* | (2006.01) |
| *H01G 11/28* | (2013.01) |
| *H01G 11/86* | (2013.01) |
| *H01M 4/04* | (2006.01) |
| *H01M 4/139* | (2010.01) |
| *B26D 1/08* | (2006.01) |
| *B26D 1/36* | (2006.01) |

(56)                    References Cited

OTHER PUBLICATIONS

English language translation of JP 2018073658 to Hiroyasu et al. obtained from https://worldwide.espacenet.com/ on Sep. 5, 2023.*
International Search Report issued in corresponding International Application No. PCT/JP2022/001546, dated Mar. 22, 2022, with English translation.

* cited by examiner

1

CUTTING DEVICE AND CUTTING METHOD

CROSS-REFERENCE TO RELATED APPLICATIONS

This application is the U.S. National Phase under 35 U.S.C. § 371 of International Patent Application No. PCT/JP2022/001546, filed on Jan. 18, 2022, which in turn claims the benefit of Japanese Patent Application No. 2021-054942, filed on Mar. 29, 2021.

BACKGROUND

Field of the Invention

The present disclosure relates to cutting devices and cutting methods.

Description of the Related Art

With the spread of electric vehicles (EVs), hybrid vehicles (HVs), plug-in hybrid vehicles (PHVs), etc., shipment of secondary batteries mounted on vehicles for use has been increasing. In particular, shipment of lithium-ion secondary batteries is increasing. In addition, secondary batteries are becoming popular not only for in-vehicle use but also as a power source for mobile terminals such as notebook PCs, for example.

The secondary battery by way of one example includes a laminated electrode body in which a plurality of electrode plates are laminated and a battery case that accommodates the laminated electrode body and an electrolytic solution. The electrode plate has a structure in which an electrode active material layer is laminated on the surface of a current collector plate composed of a metal foil, etc. In connection with such an electrode plate, Patent Literature 1, for example, discloses an electrode manufacturing facility that successively forms an electrode plate by conveying an electrode material produced by coating a strip-shaped current collector plate with an electrode active material and punching the electrode material with a die roll cutter.

Patent Literature 1: JP 2017-196669

We conducted intensive studies on the method of manufacturing electrode plates and have found that there is room for improvement in the related-art manufacturing method of punching the electrode material with a die roll cutter for the purpose of improving the quality of the electrode plate.

SUMMARY OF THE INVENTION

The present disclosure addresses the issue described above, and a purpose thereof is to provide a technology for improving the quality of electrode plates.

An aspect of the present disclosure relates to a cutting device for cutting a continuous body of an electrode plate, the electrode plate including a current collector plate having a first surface and a second surface facing away from each other, a first active material layer laminated on the first surface, and a second active material layer laminated on the second surface. The cutting device includes: a first process unit that causes a first cutting blade to advance from a side of the first active material layer to a position short of the current collector plate to form an incision in the first active material layer; and a second process unit that causes a second cutting blade to advance from a position on a side of the second active material layer that faces the incision to a position beyond the current collector plate to cut the continuous body.

Another aspect of the present disclosure relates to a cutting method for cutting a continuous body of an electrode plate, the electrode plate including a current collector plate having a first surface and a second surface facing away from each other, a first active material layer laminated on the first surface, and a second active material layer laminated on the second surface. The cutting method includes: causing a first cutting blade to advance from a side of the first active material layer to a position short of the current collector plate to form an incision in the first active material layer; and causing a second cutting blade to advance from a position on a side of the second active material layer that faces the incision to a position beyond the current collector plate to cut the continuous body.

Optional combinations of the aforementioned constituting elements, and implementations of the disclosure in the form of methods, apparatuses, and systems may also be practiced as additional aspects of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
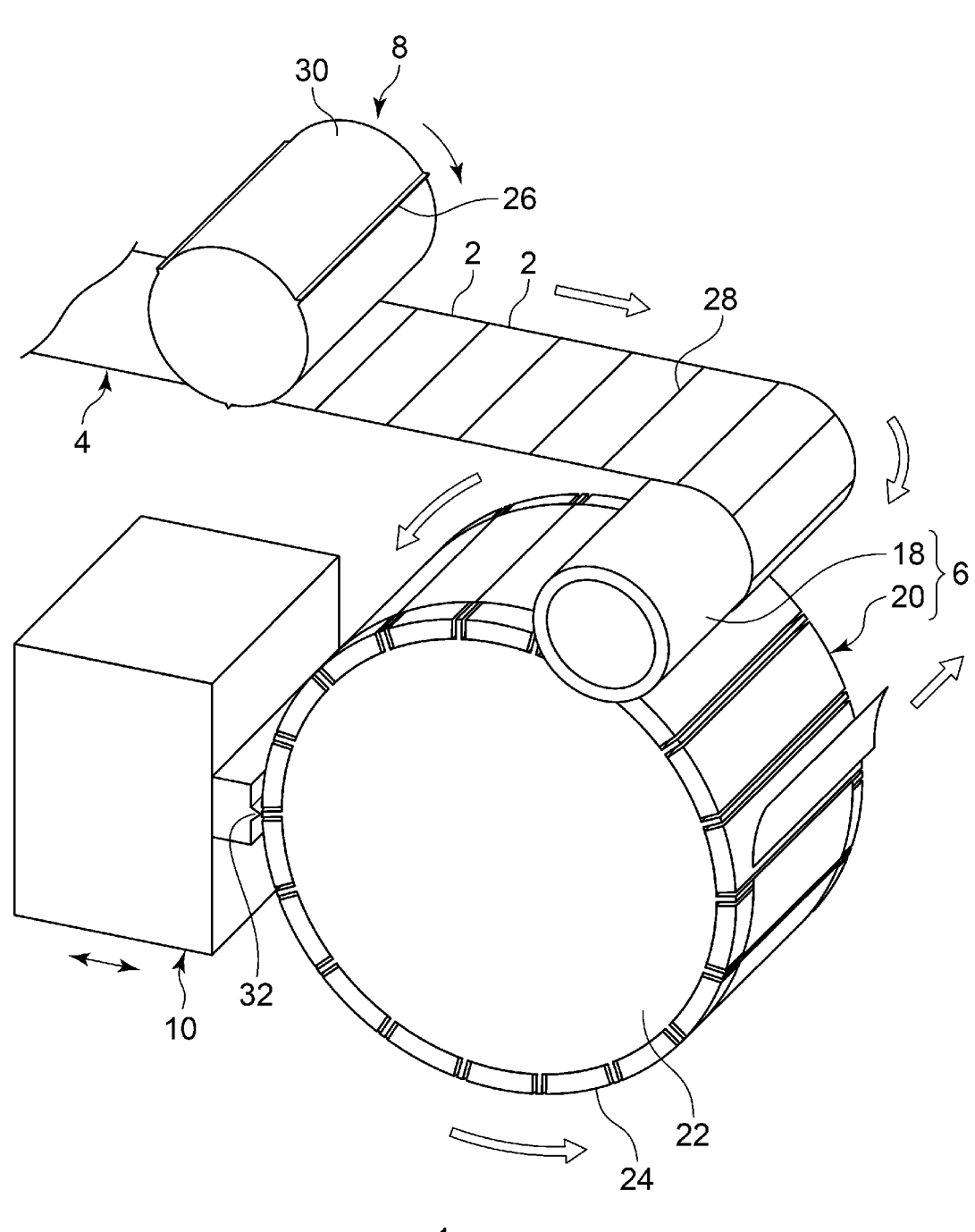
FIG. 1 is a perspective view of the cutting device according to embodiment 1.

Hereinafter, the present disclosure will be described based on preferred embodiments with reference to drawings. The embodiments do not limit the scope of the present disclosure but exemplify the disclosure. Not all of the features and the combinations thereof described in the embodiments are necessarily essential to the present disclosure. Identical or like constituting elements, members, processes shown in the drawings are represented by identical symbols and a duplicate description will be omitted as appropriate.

The scales and shapes shown in the figures are defined for convenience's sake to make the explanation easy and shall not be interpreted limitatively unless otherwise specified. Terms like "first", "second", etc. used in the specification and claims do not indicate an order or importance by any means unless otherwise specified and are used to distinguish a certain feature from the others. Those of the members that are not important in describing the embodiment are omitted from the drawings.

Embodiment 1

Figure 2:
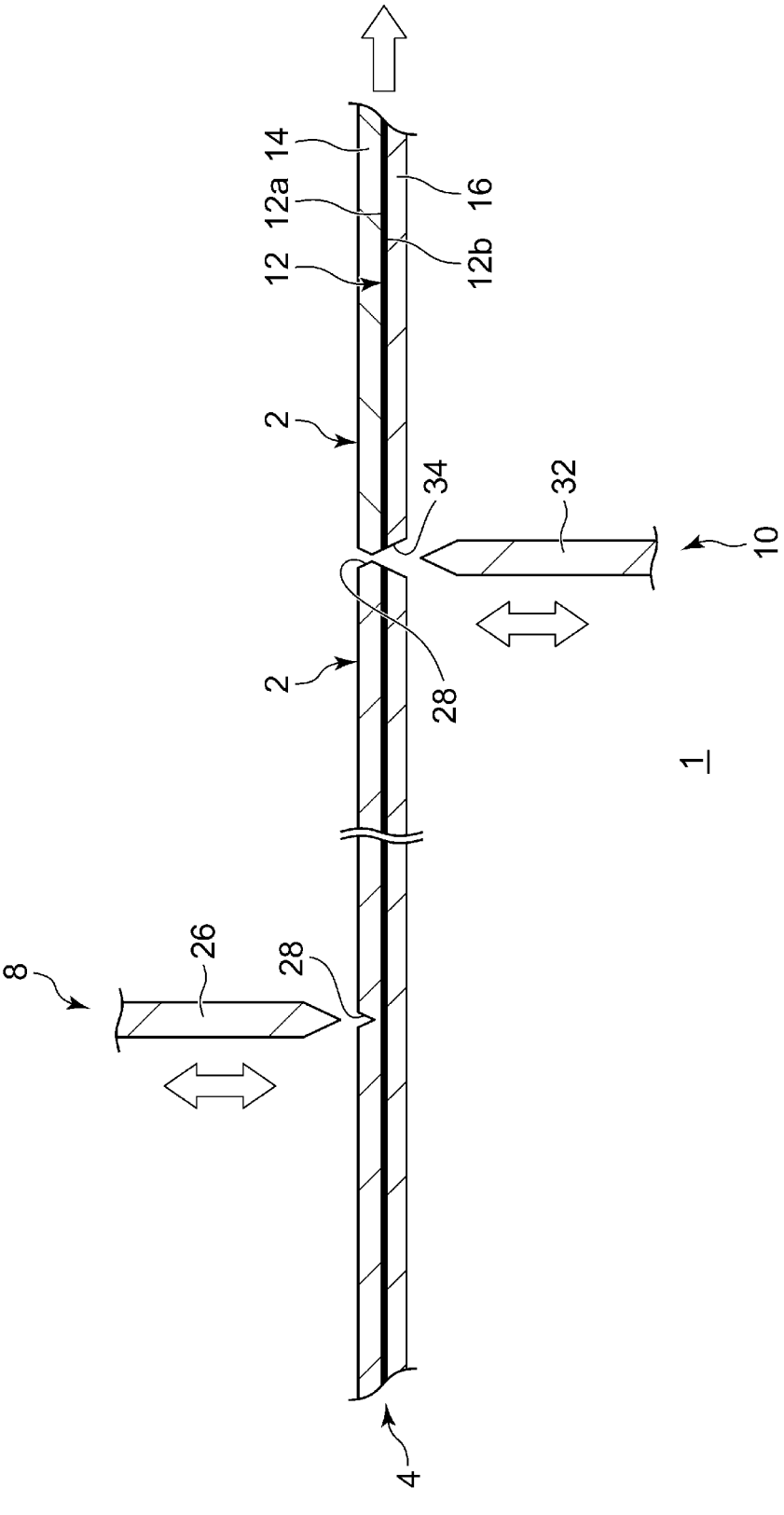
FIG. 2 is a cross-sectional view schematically showing the cutting device.

FIG. 1 is a perspective view of the cutting device 1 according to the first embodiment. FIG. 2 is a cross-sectional view schematically showing the cutting device 1. In FIG. 2, illustration of a conveying unit 6 is omitted. In a first process unit 8, only a first cutting blade 26 is illustrated. In a second process unit 10, only a second cutting blade 32 is illustrated.

Further, FIG. 2 shows a continuous body 4 in a linearly extended state. The cutting device 1 is a device that cuts a continuous body 4 of an electrode plate 2 into a plurality of pieces of the electrode plate 2. The cutting device 1 includes a conveying unit 6, a first process unit 8, and a second process unit 10.

The continuous body 4 is a strip-shaped body in which a plurality of electrode plates 2 are connected in the conveying direction of the continuous body 4. The continuous body 4 is cut by the first process unit 8 and the second process unit 10 into a plurality of pieces of the electrode plate 2. A laminated electrode body is obtained by alternately laminating the pieces of the electrode plate 2 to sandwich separators. The obtained laminated electrode body can be used in rechargeable secondary batteries such as lithium ion batteries, nickel-hydride batteries, and nickel-cadmium batteries, and in capacitors such as electric double layer capacitors.

Each electrode plate 2 includes a current collector plate 12, a first active material layer 14, and a second active material layer 16. The current collector plate 12 has a first surface 12a and a second surface 12b facing away from each other. The first active material layer 14 is laminated on the first surface 12a. The second active material layer 16 is laminated on the second surface 12b. Therefore, the electrode plate 2 has a three-layer structure in which the current collector plate 12 is sandwiched by the first active material layer 14 and the second active material layer 16. In the case of general lithium ion secondary batteries, the current collector plate 12 is comprised of aluminum foil, etc. in the case of a positive electrode and a copper foil, etc. in the case of a negative electrode. The first active material layer 14 and the second active material layer 16 can be formed by applying an electrode mixture to the first surface 12a and the second surface 12b of the current collector plate 12 by using a known coating device and by drying and rolling the resultant product. The electrode mixture is obtained by kneading materials including an electrode active material, a binder, and a conductive material in a dispersion medium and dispersing the materials uniformly. In the case of general lithium ion secondary batteries, the electrode active material is lithium cobalt oxide, lithium iron phosphate, etc. in the case of a positive electrode and graphite etc. in the case of a negative electrode.

The continuous body 4 is conveyed by the conveying unit 6. By way of one example, the conveying unit 6 conveys the continuous body 4 by the conveying roll 18, the conveying drum 20, etc. In the present embodiment, the conveying roll 18 is disposed on the upstream side of the conveying drum 20 in the conveying direction of the continuous body 4. The conveying drum 20 includes a cylindrical drum body 22 and a plurality of holding heads 24 arranged in the circumferential direction of the drum body 22. The plurality of holding heads 24 have holding surfaces that adsorb and hold the continuous body 4 and the pieces of the electrode plate 2. The holding surface of each holding head 24 faces a space outside the drum body 22. The continuous body 4 and the pieces of the electrode plate 2 are conveyed by the rotation of the drum body 22 in a state in which they are adsorbed and held by the holding surfaces of the plurality of holding heads 24.

The first process unit 8 and the second process unit 10 are disposed on the conveying path of the continuous body 4. By way of one example, the first process unit 8 is arranged on the upstream side of the conveying roll 18, and the second process unit 10 is arranged to face the conveying drum 20. The first process unit 8 is arranged to face the surface of the continuous body 4 toward the first active material layer 14.

The conveying roll 18 is arranged so that the circumferential surface of the roll is in contact with the surface of the continuous body 4 toward the second active material layer 16. The conveying direction of the continuous body 4 is turned by the conveying roll 18 to pass the continuous body 4 to the conveying drum 20. The conveying drum 20 adsorbs and holds the surface of the continuous body 4 toward the first active material layer 14 with the holding surface of each holding head 24 to convey the continuous body 4. Therefore, the continuous body 4 is conveyed with the surface toward the second active material layer 16 facing a space outside of the drum. The continuous body 4 passes between the conveying drum 20 and the second process unit 10 at a position where they face and then is conveyed to the downstream side of the conveying drum 20.

The first process unit 8 has the first cutting blade 26. In the width direction of the continuous body 4 (the direction perpendicular to the conveying direction), the first cutting blade 26 extends to overlap the entire continuous body 4. The first process unit 8 causes the first cutting blade 26 to advance from the side of the continuous body 4 toward the first active material layer 14 to a position short of the current collector plate 12 to form the incision 28 in the first active material layer 14. The first process unit 8 forms the incision 28 at a boundary between two adjacent electrode plates 2. The depth of the incision 28 is, for example, about 30-80% of the thickness of the first active material layer 14. The incision 28 is provided only in a part of the first active material layer 14 in the direction of thickness of the continuous body 4. Even after the incision 28 is formed, therefore, two adjacent electrode plates 2 are maintained in a state of being joined by way of the remainder of the first active material layer 14, the current collector plate 12, and the second active material layer 16. The incision 28 may be formed over the entirety of the direction of thickness of the first active material layer 14. In this case, too, two adjacent electrode plates 2 are maintained in a state of being joined by way of the current collector plate 12 and the second active material layer 16.

The first process unit 8 of this embodiment successively forms the incision 28 in the continuous body 4 that is successively fed by the conveying unit 6. By way of one example, the first process unit 8 has a first roll 30 that rotates synchronously with the conveyance of the continuous body 4. The first cutting blade 26 is provided on the circumferential surface of the first roll 30. That is, the first process unit 8 has a die roll cutter. As the first roll 30 rotates synchronously with the conveyance of the continuous body 4, the incision 28 is successively formed.

Further, the cutting device 1 may have a support unit (not shown) that supports the continuous body 4 at a position facing the first process unit 8 across the continuous body 4. The support unit is comprised of, for example, a roll that rotates synchronously with the conveyance of the continuous body 4. By sandwiching the continuous body 4 by the first cutting blade 26 and the support unit, the incision 28 can be formed more properly. Further, the accuracy of the depth of the incision 28 can be increased.

The continuous body 4 formed with the incision 28 is conveyed to a position where the conveying drum 20 and the second process unit 10 face. In a state in which the continuous body 4 is adsorbed and held by the conveying drum 20, the incision 28 is disposed between two adjacent holding heads 24. The second process unit 10 is provided so that it can advance and recede with respect to the conveying drum 20 in the radial direction of the conveying drum 20. Further, the second process unit 10 has the second cutting blade 32 that faces the conveying drum 20. The second process unit 10 advances toward the conveying drum 20 and causes the second cutting blade 32 to advance from a position on the side of the second active material layer 16 of the continuous body 4 that faces the incision 28 to a position beyond the current collector plate 12.

The second cutting blade 32 advances into the continuous body 4 from the side of the second surface 12*b* at a position aligned with the incision 28 as viewed in the direction of thickness of the continuous body 4 and penetrates at least the current collector plate 12. This forms an incision 34 at least in the second active material layer 16 and the current collector plate 12. Preferably, the second cutting blade 32 advances until it reaches the incision 28. Thereby, an incision 34 is also formed in a portion of the first active material layer 14 not provided with the incision 28. Preferably, the second cutting blade 32 advances so that the cutting edge thereof does not reach beyond the incision 28 or the first active material layer 14, that is, does not reach beyond the surface of the continuous body 4 toward the first active material layer 14. More preferably, the second process unit 10 recedes from the continuous body 4 when the cutting edge of the second cutting blade 32 reaches the bottom of the incision 28. The second process unit 10 successively forms the incision 34 in the continuous body 4 that is sequentially fed by the conveying unit 6.

As a result of the incision 34 being formed, the continuous body 4 is cut and the electrode plate 2 is turned into pieces. Each piece of the electrode plate 2 is conveyed in a state of being adsorbed and held by each holding head 24 and passed to a downstream conveying mechanism.

As described above, the cutting device 1 according to the present embodiment is an apparatus for cutting the continuous body 4 in which a plurality of electrode plates 2 are continuous. Each electrode plate 2 has a structure in which the first active material layer 14 is laminated on the side of the current collector plate 12 toward the first surface 12*a*, and the second active material layer 16 is laminated on the side of the second surface 12*b*. The cutting device 1 includes: the first process unit 8 that causes the first cutting blade 26 to advance into the continuous body 4 from the side of the first active material layer 14 to a position short of the current collector plate 12 to form the incision 28 in the first active material layer 14; and the second process unit 10 that causes the second cutting blade 32 to advance into the continuous body 4 from a position on the side of the second active material layer 16 facing the incision 28 to a position beyond the current collector plate 12 to cut the continuous body 4.

One known method of dividing the continuous body 4 into a plurality of pieces of the electrode plate 2 is to punch out the continuous body 4 from the side of one surface with a die roll cutter. In this method, however, friction is caused between the cut surface of the continuous body 4 or the electrode plate 2 and the trunk of the cutting blade, increasing the risk of burrs being produced on the cut surface. Burrs produced on the cut surface can cause a short circuit and so induce a decrease in battery quality. Further, friction between the cut surface and the trunk of the cutting blade can result in the electrode active material layer laminated toward the other surface of the continuous body 4 dropping off. Dropping of the electrode active material layer can also lead to a decrease in battery quality.

In the cutting device 1 of the present embodiment, on the other hand, the first process unit 8 causes the first cutting blade 26 to advance from the side of the first active material layer 14 to form the incision 28 only in the first active material layer 14, and then the second process unit 10 causes the second cutting blade 32 to advance from the side of the second active material layer 16 to cut the continuous body 4. This ensures that the amount of advancement of the first cutting blade 26 and the second cutting blade 32 into the continuous body 4 is smaller than the thickness of the continuous body 4. As a result, friction between the cut surface of the continuous body 4 or the electrode plate 2 and the trunk of the cutting blade can be reduced, and occurrence of burrs can be suppressed. Further, dropping of the electrode active material layer due to friction between the cut surface and the trunk of the cutting blade can be suppressed. Therefore, the quality of the electrode plate 2 can be improved.

To reduce the amount of advancement of the cutting blade into the continuous body 4, the cutting blade may, for example, be introduced into the continuous body 4 only from the side of the second active material layer 16 to cut only the second active material layer 16 and the current collector plate 12. In this case, the first active material layer 14 is divided by a force applied to the continuous body 4 as the cutting blade pushes and extends the second active material layer 16 and by a tensile stress applied to the continuous body 4 conveyed. However, the electrode active material layer is a layer produced by pressing and solidifying a powder. For this reason, when the first active material layer 14 is pulled and divided, an irregular cross section may be formed or a part of the layer 14 may fall off.

This is addressed by the present embodiment by providing in advance the first active material layer 14 with the incision 28 that guides the division. This ensures the planarity or linearity of the cut surface of the first active material layer 14. Therefore, the quality of the electrode plate 2 can be improved. When the second cutting blade 32 does not advance into the continuous body 4 as far as the incision 28, a state in which the first active material layer 14 remains continuous in a portion is maintained. That portion will be cut by a tensile stress, etc. applied to the continuous body 4. In the present embodiment, the incision 28 is provided in the first active material layer 14 so that any tensile stress, etc. applied to the continuous body 4 is concentrated in the incision 28. Thereby, the first active material layer 14 is cut along the incision 28. For this reason, the linearity of the cut surface of the first active material layer 14 can be ensured, and the quality of the electrode plate 2 can be improved.

A tensile stress may be applied to the continuous body 4 being cut. In the cutting device 1 of the present embodiment, a tensile stress associated with conveyance is applied to the continuous body 4. Further, a tensile stress larger than the tensile stress associated with conveyance may be applied to the continuous body 4. By applying a tensile stress to the continuous body 4, the electrode active material layer can be pulled away from the trunk of the blade at the moment when the continuous body 4 is cut. This is expected to provide an effect of suppressing the shear force applied to the electrode active material layer.

The cutting device 1 of the present embodiment also includes the conveying unit 6 that conveys the continuous body 4. The first process unit 8 and the second process unit 10 are disposed on the conveying path of the continuous body 4 to form the incision 28 in the continuous body 4 fed successively and to cut the continuous body 4. This can improve the throughput of the cutting device 1.

Further, the first process unit 8 of the present embodiment has the first roll 30, the first cutting blade 26 being provided on the circumferential surface of the first roll 30, and the first roll 30 rotating synchronously with the conveyance of the continuous body 4. This makes it possible to form the incision 28 successively in the continuous body 4 with a simpler configuration.

Embodiment 2

Figure 3:
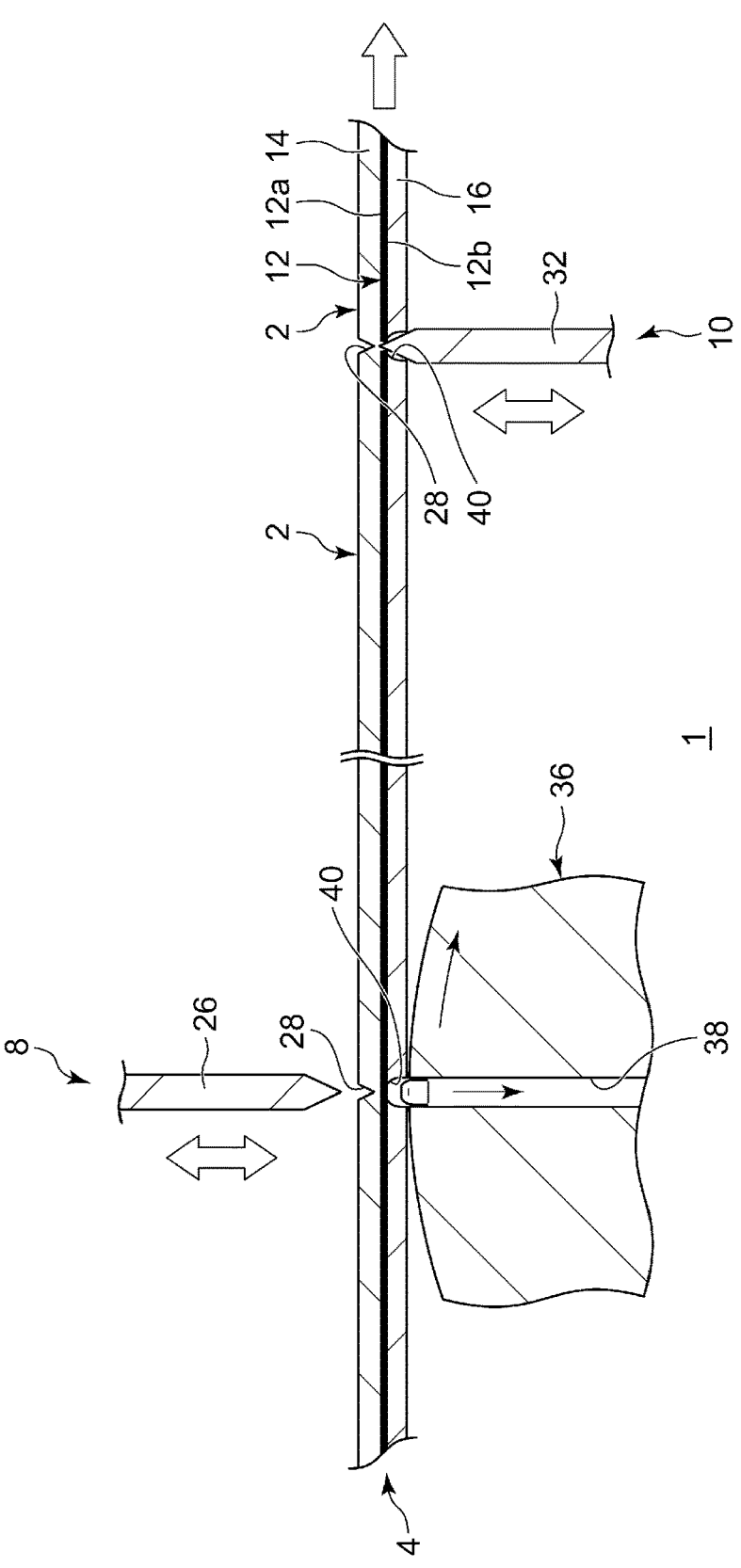
FIG. 3 is a cross-sectional view schematically showing the cutting device according to embodiment 2.

Embodiment 2 has a configuration similar to that of embodiment 1 except that a grooved support unit is provided. Hereinafter, the present embodiment will be described, highlighting the configuration different from embodiment 1. The common configuration will be briefly described or omitted from the description. FIG. 3 is a cross-sectional view schematically showing the cutting device 1 according to embodiment 2. In FIG. 3, illustration of a conveying unit 6 is omitted. In the first process unit 8, only the first cutting blade 26 is illustrated. In the second process unit 10, only the second cutting blade 32 is illustrated. Further, FIG. 3 shows a continuous body 4 in a linearly extended state.

The cutting device 1 of the present embodiment includes a support unit 36 at a position facing the first process unit 8 across the continuous body 4. The support unit 36 supports the continuous body 4 from the back side when the first cutting blade 26 of the first process unit 8 is pressed against the continuous body 4. The support unit 36 of the present embodiment is, for example, comprised of a roll that rotates synchronously with the conveyance of the continuous body 4. The support unit 36 has a groove 38 that is recessed in a direction away from the first process unit 8 at a position facing the first cutting blade 26. By way of one example, the groove 38 extends in the width direction of the continuous body 4 so as to overlap the entire first cutting blade 26.

When the first cutting blade 26 advances into the continuous body 4 from the side of the first active material layer 14 to cause the continuous body 4 to be pressed against the support unit 36, a portion of the second active material layer 16 that overlaps the groove 38 is crushed at the edge of the groove 38 because there is not any supporting surface. Then, the portion peels off from the current collector plate 12 and falls into the groove 38. Thereby, a linear peeled part 40 corresponding to the groove 38 is formed at a position of the second active material layer 16 facing the incision 28. Preferably, the width of the groove 38 (the size in the conveying direction of the continuous body 4) is narrower than the width of the first cutting blade 26. This makes it easy for the second active material layer 16 to be crushed at the edge of the groove 38 and to form the peeled part 40. The width of the groove 38 is, for example, defined as the width of a portion (opening) that intersects the surface of the support unit 36. The width of the first cutting blade 26 is, for example, defined as the width of the end of the trunk (blade) of the first cutting blade 26 toward the cutting edge. The active material that has fallen into the groove 38 may be collected by a suction mechanism (not shown), etc.

The continuous body 4 formed with the incision 28 and the peeled part 40 is conveyed by the conveying drum 20 to the second process unit 10. The second process unit 10 causes the second cutting blade 32 to advance to the peeled part 40 from the side of the continuous body 4 toward the second active material layer 16. Thereby, the current collector plate 12 is cut, and the electrode plate 2 is turned into pieces.

The cutting device 1 according to the present embodiment can also provide the same benefit as the cutting device 1 according to embodiment 1. In further accordance with the present embodiment, the peeled part 40, which serves as an indicator of the position of the incision 28 is formed in the second active material layer 16. This makes it easy to cause the second cutting blade 32 to advance to a position facing the incision 28. Therefore, the quality of the electrode plate 2 can be improved further.

Embodiment 3

Figure 4:
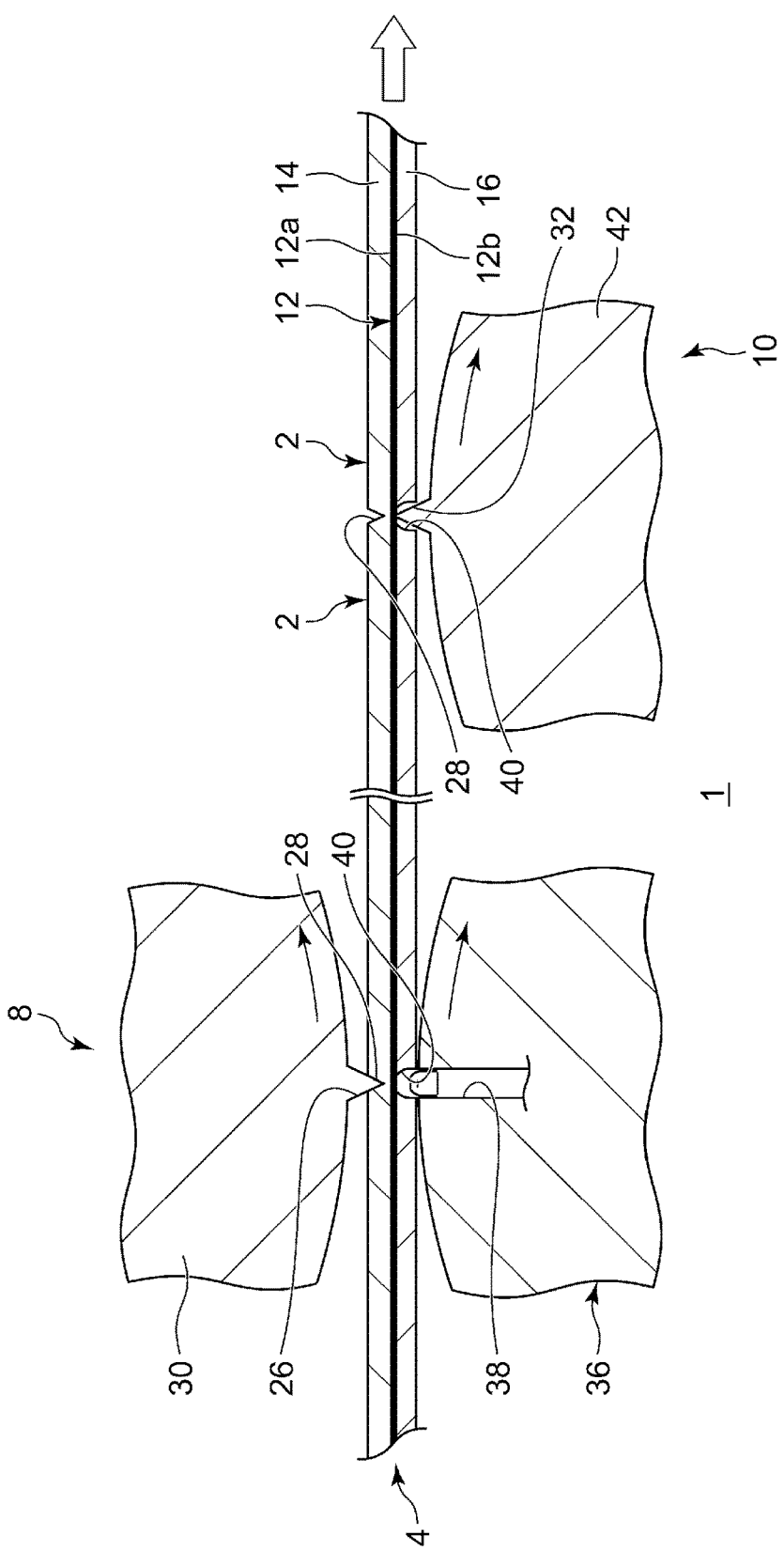
FIG. 4 is a cross-sectional view schematically showing the cutting device according to embodiment 3.

Embodiment 3 has a configuration similar to that of the embodiment 2 except for the shape of the second process unit 10. Hereinafter, the present embodiment will be described, highlighting the configuration different from embodiment 2. The common configuration will be briefly described or omitted from the description. FIG. 4 is a cross-sectional view schematically showing the cutting device 1 according to embodiment 3. In FIG. 4, illustration of the conveying unit 6 is omitted. In the first process unit 8, only the first cutting blade 26 and a part of the first roll 30 are illustrated. In the second process unit 10, only the second cutting blade 32 and a part of the second roll 42 are illustrated. Further, FIG. 4 shows a continuous body 4 in a linearly extended state.

The first process unit 8 of the present embodiment has the first roll 30, the first cutting blade 26 being provided on the circumferential surface of the first roll 30, and the first roll 30 rotating synchronously with the conveyance of the continuous body 4. That is, the first process unit 8 has a die roll cutter. Further, the second process unit 10 of the present embodiment has a second roll 42, the second cutting blade 32 being provided on the circumferential surface of the second roll 42, and the second roll 42 rotating synchronously with the conveyance of the continuous body 4. Further, the cutting device 1 of the present embodiment is configured such that the support unit 36 having the groove 38 is disposed at a position facing the first process unit 8 across the continuous body 4.

As the first roll 30 rotates synchronously with the conveyance of the continuous body 4, the first cutting blade 26 is inserted to a boundary between two adjacent electrode plates 2 to form the incision 28. Along with the formation of the incision 28, the peeled part 40 is formed at a position in the second active material layer 16 facing the incision 28. The support unit 36 may be omitted. Further, as the second roll 42 rotates synchronously with the conveyance of the continuous body 4, the second cutting blade 32 is inserted into the peeled part 40 from the side of the second active material layer 16 to cut the current collector plate 12.

The cutting device 1 according to the present embodiment can also provide the same benefit as the cutting device 1 according to embodiment 1. Further, a second process unit 10 of the present embodiment has the second roll 42, the second cutting blade 32 being provided on the circumferential surface of the second roll 42, and the second roll 42 rotating synchronously with the conveyance of the continuous body 4. This makes it possible to turn the electrode plate 2 into pieces with a simpler configuration. The use of the second roll 42 in the second process unit 10 and the use of the first roll 30 in the first process unit 8 can be implemented independently. For example, the second process unit 10 may be a die roll cutter, and the first process unit 8 may be structured to cause the first cutting blade 26 to advance and recede with respect to the continuous body 4 in a direction intersecting the conveying direction of the continuous body 4.

The embodiments of the present disclosure are described above in detail. The embodiments described above are merely specific examples of practicing the present disclosure. The details of the embodiments shall not be construed as limiting the technical scope of the present disclosure. A number of design modifications such as modification, addition, deletion, etc. of constituting elements may be made to the extent that they do not depart from the idea of the present disclosure defined by the claims. New embodiments with design modifications will provide the combined advantages of the embodiment and the variation. Although the details subject to such design modification are emphasized in the embodiment described above by using phrases such as "of this embodiment" and "in this embodiment", details not referred to as such are also subject to design modification. Any combination of the above constituting elements is also useful as a mode of the present disclosure. Hatching in the cross section in the drawings should not be construed as limiting the material of the hatched object.

The embodiments may be defined by the following items.

[Item 1]A cutting device (1) for cutting a continuous body (4) of an electrode plate (2), the electrode plate (2) including a current collector plate (12) having a first surface (12a) and a second surface (12b) facing away from each other, a first active material layer (14) laminated on the first surface (12a), and a second active material layer (16) laminated on the second surface (12b), the cutting device (1) including:

a first process unit (8) that causes a first cutting blade (26) to advance from a side of the first active material layer (14) to a position short of the current collector plate (12) to form an incision (28) in the first active material layer (14); and a second process unit (10) that causes a second cutting blade (32) to advance from a position on a side of the second active material layer (16) that faces the incision (28) to a position beyond the current collector plate (12) to cut the continuous body (4).

[Item 2] The cutting device (1) according to Item 1, further comprising:

a conveying unit (6) that conveys the continuous body (4), wherein the first process unit (8) and the second process unit (10) are disposed on a conveying path of the continuous body (4).

[Item 3] The cutting device (1) according to Item 2, wherein the first process unit (8) has a first roll (30), the first cutting blade (26) being provided on a circumferential surface of the first roll (30), and the first roll (30) rotating synchronously with conveyance of the continuous body (4).

[Item 4] The cutting device (1) according to Item 2 or 3, wherein the second process unit (10) has a second roll (42), the second cutting blade (32) being provided on a circumferential surface of the second roll (42), and the second roll (42) rotating synchronously with conveyance of the continuous body (4).

[Item 5] The cutting device (1) according to any one of Items 1 through 4, wherein the cutting device (1) includes a support unit (36) that faces the first process unit (8) across the continuous body (4) and supports the continuous body (4), and the support unit (36) has a groove (38) that is recessed in a direction away from the first process unit (8) at a position facing the first cutting blade (26).

[Item 6]A cutting method for cutting a continuous body (4) of an electrode plate (2), the electrode plate (2) including a current collector plate (12) having a first surface (12a) and a second surface (12b) facing away from each other, a first active material layer (14) laminated on the first surface (12a), and a second active material layer (16) laminated on the second surface (12b), the cutting method including:

causing a first cutting blade (26) to advance from a side of the first active material layer (14) to a position short of the current collector plate (12) to form an incision (28) in the first active material layer (14); and causing a second cutting blade (32) to advance from a position on a side of the second active material layer (16) that faces the incision (28) to a position beyond the current collector plate (12) to cut the continuous body (4).

The invention claimed is:

1. A cutting method for cutting a continuous body of an electrode plate, the electrode plate including a current collector plate having a first surface and a second surface facing away from each other, a first active material layer laminated on the first surface, the first active material layer having a third surface on a side opposite to the current collector plate, and a second active material layer laminated on the second surface, the second active material layer having a fourth surface on a side opposite to the current collector plate, the cutting method comprising:

causing a first cutting blade to advance from the third surface of the first active material layer toward the current collector plate, the first cutting blade penetrating into the first active material layer to form an incision in the first active material layer without reaching the current collector plate; and causing a second cutting blade to advance from the fourth surface of the second active material layer toward the current collector plate, the second cutting blade penetrating through the current collector plate to reach the incision formed in the first active material layer to cut the continuous body.

2. The cutting method according to claim 1, further comprising conveying the continuous body along a conveying path, wherein the first cutting blade and the second cutting blade are arranged on the conveying path.

3. The cutting method according to claim 2, wherein the first cutting blade is provided on a circumferential surface of a first roll, and the first roll rotates synchronously with conveyance of the continuous body.

4. The cutting method according to claim 2, wherein the second cutting blade is provided on a circumferential surface of a second roll, and the second roll rotates synchronously with conveyance of the continuous body.

5. The cutting method according to claim 1, further comprising supporting the continuous body by a supporting unit such that an edge of the first cutting blade faces the supporting unit through the continuous body, wherein the support unit has a groove that is recessed in a direction away from the first cutting blade at a position facing the edge of the first cutting blade.

* * * * *